United States Patent
Graham

(10) Patent No.: US 7,152,552 B1
(45) Date of Patent: Dec. 26, 2006

(54) MODULAR AQUATIC DISPLAY ASSEMBLY

(76) Inventor: Leslie L. Graham, 280 Odebolt Dr., Thousand Oaks, CA (US) 91360

( * ) Notice: Subject to any disclaimer, the term of this patent is extended or adjusted under 35 U.S.C. 154(b) by 0 days.

(21) Appl. No.: 11/158,779

(22) Filed: Jun. 23, 2005

(51) Int. Cl.
*A01K 63/00* (2006.01)
*A01K 63/04* (2006.01)
*A01K 63/06* (2006.01)

(52) U.S. Cl. ...................... 119/247; 119/253
(58) Field of Classification Search ............... 108/143, 108/17, 25, 26, 50.11, 67, 92, 101, 147.11, 108/110, 56.1, 56.3, 59, 93, 64–66, 102, 106, 108/107; 261/DIG. 14; D30/101, 104; 248/127, 248/128, 146, 150, 151, 158, 161, 407, 420, 248/423, 165, 176.1, 318, 346.03, 346.04, 248/346.3; 47/39; 119/253, 247, 258, 269, 119/245, 246, 267, 224, 225
See application file for complete search history.

(56) References Cited

U.S. PATENT DOCUMENTS

| | | | |
|---|---|---|---|
| D40,361 S | 11/1909 | Moore et al. | |
| 1,220,447 A | 3/1917 | Onken | |
| 1,265,373 A | 5/1918 | Philip | |
| D84,001 S | 4/1931 | Scott et al. | |
| D109,478 S | 5/1938 | Furrey | |
| 4,056,897 A * | 11/1977 | Pearce et al. | ................... 47/39 |
| 4,807,539 A * | 2/1989 | Del Castillo von Haucke | .. 108/60 |
| 5,114,022 A * | 5/1992 | Rood | ....................... 211/85.23 |
| 5,197,409 A | 3/1993 | Hammond | |
| 5,335,753 A * | 8/1994 | Campbell | ................. 182/186.5 |
| 6,041,740 A * | 3/2000 | Newman | ..................... 119/261 |

* cited by examiner

*Primary Examiner*—Son T. Nguyen

(57) ABSTRACT

An assembly includes a plurality of uniquely shaped modular members provided with at least one linear slot formed therein and a body provided with a uniform thickness. Selected ones of the modular members have monolithically formed tab portions extending outwardly therefrom and are removably interfitted with the slots. A reservoir is provided with detachably conjoined upper and lower regions directly conjoined to each other wherein the upper region defines a cavity for housing water and aquatic creatures. The lower region is directly engageable with selected ones of the modular members so that the reservoir can be maintained at a substantially stable and elevated position above a ground surface. The reservoir includes a mechanism for illuminating an outer perimeter of the lower region housed with the lower region and isolated from the upper region and a mechanism for removing undesirable debris from the water contained within the upper region.

18 Claims, 3 Drawing Sheets

MODULAR AQUATIC DISPLAY ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to display shelving systems and, more particularly, to a modular aquatic display assembly.

2. Prior Art

Most pet stores and aquariums which sell or display aquatic life use a metal platform system, if any system at all, to elevate the required number of aquatic display tanks to the eye level of prospective customers. Individual light fixtures are often placed over each of the tanks to provide illumination, with power strips or extension cords being used to distribute power to the light fixture from a wall outlet. Filtration and aeration systems are also commonly installed in each of the tanks. The various wires and tubes from the filtration, aeration and lighting units were, in most instances, clearly visible to the customers along with the intended aquatic display. This tended to aesthetically diminish the aquatic display as a whole.

In addition, the metal platforms which were used to support the aquatic tanks at eye level were susceptible to corrosion, particularly from leakage or splashing, which often occurs, from salt water tanks which are used to display oceanic marine life. The rust spots and stains created by such corrosion further detracted from the aesthetic appearance of the display.

Another disadvantage of metallic display racks is that they are electrically conductive. This created a risk of an electrical shock being passed on to a customer or to the marine life being displayed in the tanks. This risk was particularly high when used with salt water display tanks, since salt water is electrically conductive as well. Metal racks are also heavy, and difficult to customize for a particular display design.

Accordingly, a need remains for a system for displaying a plurality of aquatic tanks, such as for an aquarium or pet store, which is more aesthetically pleasing, less susceptible to corrosion, protected against transmitting electrical shocks, more lightweight, and better suited for customization to a particular application than systems which have been known and used in the past. The present invention satisfies such a need by providing a decorative display unit for multiple beta fish that permits each fish to be stored and displayed in an individual container. Such a display assembly is constructed from glass tubing in a variety of sizes, shapes, and designs.

BRIEF SUMMARY OF THE INVENTION

In view of the foregoing background, it is therefore an object of the present invention to provide an assembly for allowing a user to create a variety of aquatic display stands.

These and other objects, features, and advantages of the invention are provided by an assembly including a plurality of uniquely shaped modular members formed from non-corrosive material and sized and shaped for being interfitted in a variety of patterns. Each modular member is provided with at least one linear slot formed therein and has a body provided with a uniform thickness and further has planar top and bottom surfaces such that a selected body portion of the modular members can be slidably and directly engaged within the slots respectively. Each of the slots is coextensively spaced such that the slots can be directly and interchangeably engaged. Selected ones of the modular members have monolithically formed tab portions extending outwardly therefrom and are removably interfitted with the slots.

A reservoir is provided with detachably conjoined upper and lower regions directly conjoined to each other wherein the upper region defines a cavity for housing water and aquatic creatures. The lower region is directly engageable with selected ones of the modular members so that the reservoir can be maintained at a substantially stable and elevated position above a ground surface. The reservoir includes a mechanism for illuminating an outer perimeter of the lower region housed with the lower region and isolated from the upper region.

The reservoir further includes a mechanism for removing undesirable debris from the water contained within the upper region. Such a debris removing mechanism is housed within the lower region and is in direct fluid communication with the upper region. A controller for manually activating the illuminating mechanism and the debris removing mechanism based upon a user input is also included. The illuminating mechanism preferably includes an internal power supply source directly and electrically mated to the controller and a plurality of LEDs juxtaposed along a perimeter of the lower region. The LEDs are electrically mated to the controller such that the user can selectively illuminate the LEDs as desired.

The lower region preferably includes a plurality of transparent segments and a plurality of opaque segments directly interlocked therewith. The LEDs may be seated adjacent the transparent segments and away from the opaque segments so that light rays can exit through the lower region and illuminate a surrounding exterior of the reservoir.

The debris removing mechanism includes a pump directly and electrically mated to the controller and a filter in fluid communication with the pump and the upper region. The filter is nested with the lower region and situated intermediate of the pump and the upper region.

A first conduit having opposed end portions is directly and monolithically conjoined with the pump and the filter and a second conduit is in direct fluid communication with the filter and the upper region. A third conduit is in direct fluid communication with the upper region and the pump. The first, second and third conduits cooperate with the pump and the filter for recycling and filtering water out of the reservoir along a unidirectional path.

The filter includes a pair of independent cartridges removably nested side-by-side. One of the cartridges is formed from carbon material and another of the cartridges is formed from mesh material. The lower region further includes an access door for allowing the user to replace the cartridges during repeated use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
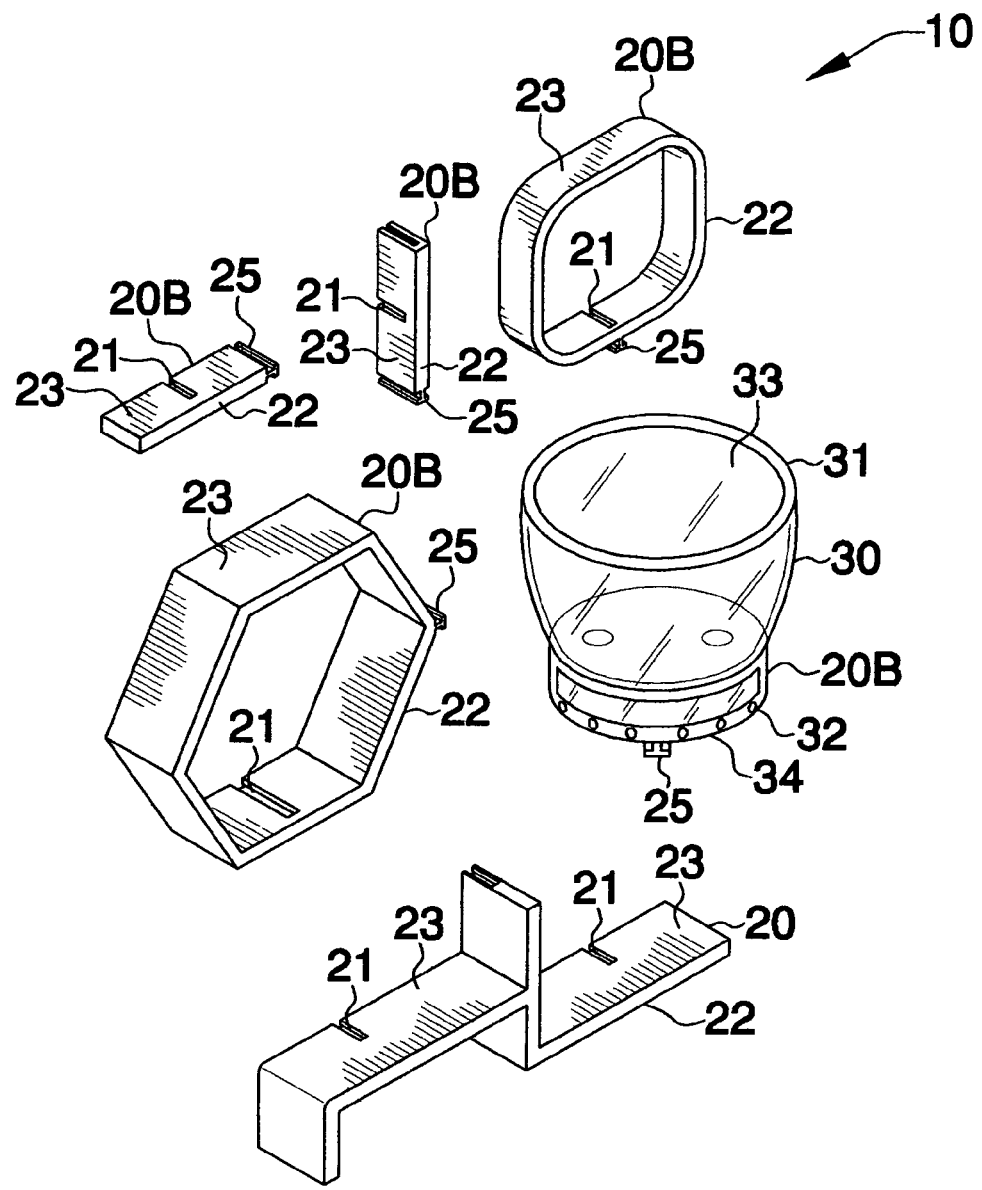
FIG. 1 is a perspective view showing a modular aquatic display apparatus, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–5 by the reference numeral 10 and is intended to provide an assembly for allowing a user to create a variety of aquatic display stands. It should be understood that the assembly 10 may be used to different types of aquatic and non-aquatic objects, and should not be limited in use to only beta fish.

Figure 2:
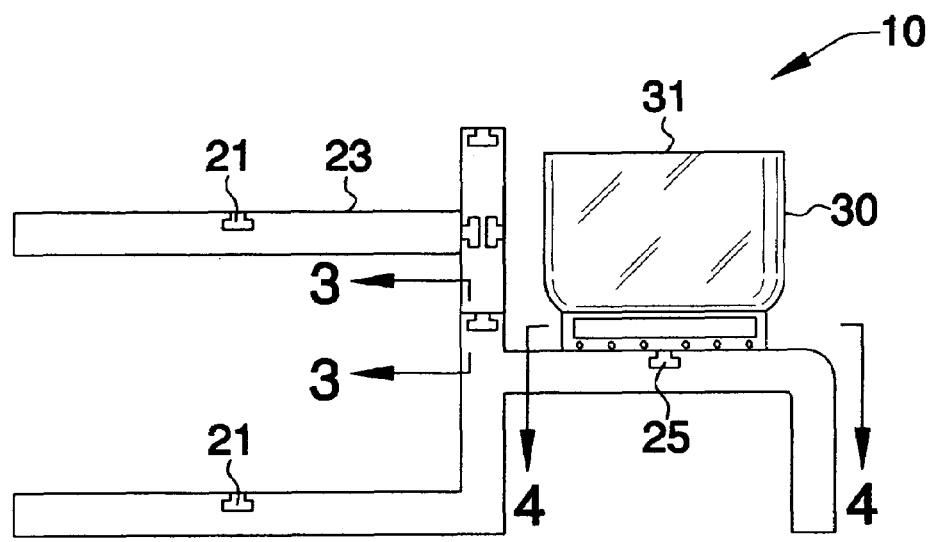
FIG. 2 is a side elevational view of the apparatus shown in FIG. 1, in a preferred environment.

Referring to FIG. 1, the assembly 10 includes a plurality of uniquely shaped modular members 20 formed from non-corrosive material and sized and shaped for being interfitted in a variety of patterns. Each modular member 20 is provided with at least one linear slot 21 formed therein and has a body 22 provided with a uniform thickness and further has planar top 23 and bottom (not shown) surfaces such that a selected body portion 20A of the modular members 20 can be slidably and directly engaged, with no intervening elements, within the slots 21 respectively, as shown in FIG. 2.

Figure 3:
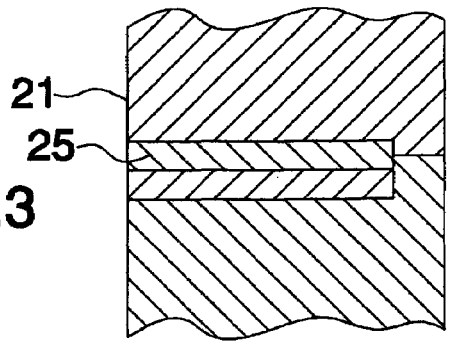
FIG. 3 is a cross-sectional view of a tab portion interfitted with a slot, taken along line 3—3.

Each of the slots 21 is coextensively spaced such that the slots 21 can be directly and interchangeably engaged, with no intervening elements. Selected ones 20B of the modular members 20 have monolithically formed tab portions 25 extending outwardly therefrom and are removably interfitted with the slots 21, as shown in FIG. 3. The slots 21 are critical for enabling a user to easily and quickly conjoin the modular members to add sections or modify the display arrangement as fish are added or subtracted. Such an arrangement is particularly well suited for storing and housing beta fish, or Siamese fighting fish, as commonly known. Because these fish fight each other, they must be housed in separate containers in order for them to survive and flourish.

Such a design further aids an owner in easily removing individual members for cleaning and maintenance, without disturbing other fish or disrupting the overall structure. The assembly 10 provides each beta fish with its own individual reservoir (described herein below) which could be produced in a variety of shapes and sizes, as is obvious to one having ordinary skill in the art. The assembly 10 is preferably formed from glass tubing to form an ageometrically shaped design, but may be formed from plastic or other transparent materials.

Still referring to FIG. 1, reservoir 30 is provided with detachably conjoined upper 31 and lower 32 regions directly conjoined, with no intervening elements, to each other wherein the upper region 31 defines a cavity 33 or housing water and aquatic creatures. The lower region 32 is directly engageable with selected ones of the modular members 20 so that the reservoir 30 can be maintained at a substantially stable and elevated position above a ground surface. The reservoir 30 includes a mechanism 40 for illuminating an outer perimeter 34 of the lower region 32 housed with the lower region 32 and isolated from the upper region 31.

Figure 4:
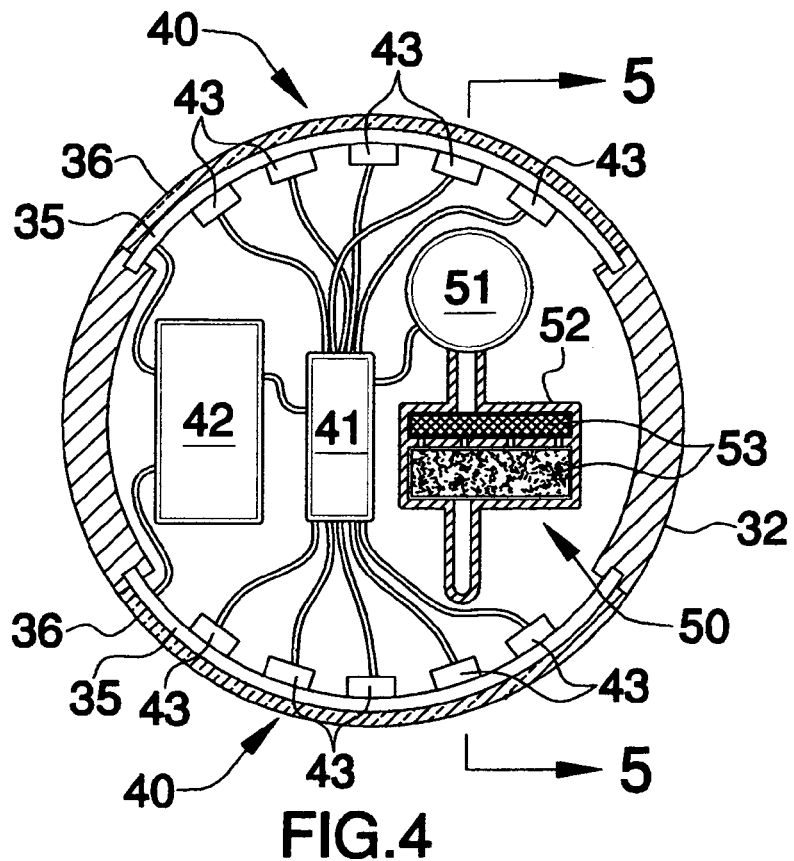
FIG. 4 is a cross-sectional view of the lower region, taken along line 44.
Figure 5:
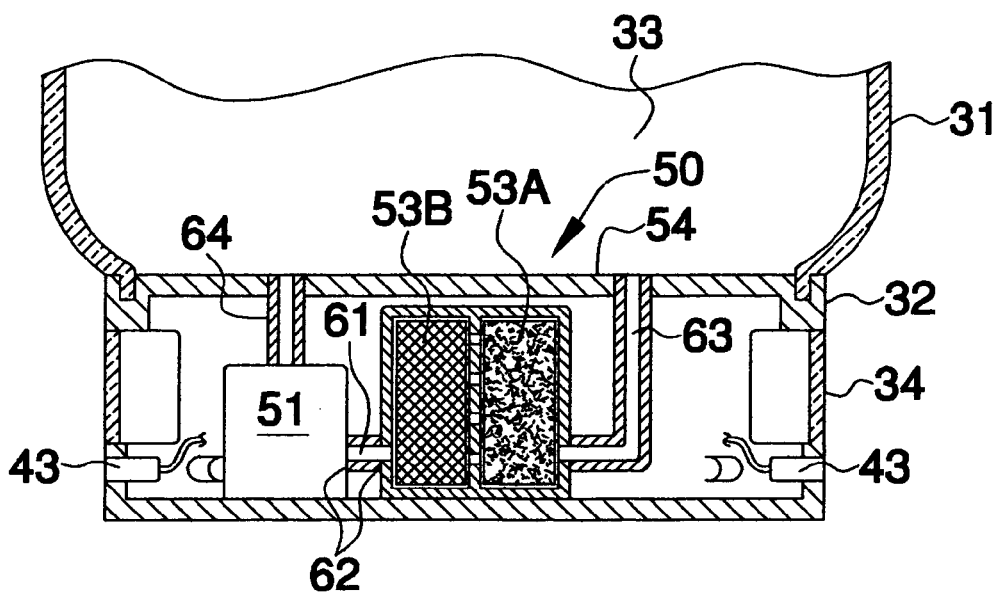
FIG. 5 is a cross-sectional view of the lower region, taken along line 5—5.

Referring to FIGS. 4 and 5, the reservoir 30 further includes a mechanism 50 for removing undesirable debris from the water contained within the upper region 31. Such a debris removing mechanism 50 is housed within the lower region 32 and is in direct fluid communication with the upper region 31. A controller 41 for manually activating the illuminating mechanism 40 and the debris removing mechanism 50 based upon a user input is also included. Such a debris removing mechanism is critical to maintaining a healthy environment for fish housed therein by filtering contaminants from the water. The illuminating mechanism 40 includes an internal power supply source 42 directly and electrically mated, with no intervening elements, to the controller 41 and a plurality of LEDs 43 juxtaposed along a perimeter of the lower region 32. The LEDs 43 are electrically mated to the controller 41 such that the user can selectively illuminate the LEDs 43 as desired.

Referring to FIG. 4, the lower region 32 includes a plurality of transparent segments 35 and a plurality of opaque segments 36 directly interlocked, with no intervening elements, therewith. The LEDs 43 are seated adjacent the transparent segments 35 and away from the opaque segments 36 so that light rays can exit through the lower region 32 and illuminate a surrounding exterior of the reservoir 30. Such LEDs 43 provide a dynamic and The debris removing mechanism 50 includes a pump 51 directly and electrically mated, with no intervening elements, to the controller 41 and a filter 52 in fluid communication with the pump 51 and the upper region 31. The filter 52 is nested with the lower region 32 and situated intermediate of the pump 51 and the upper region 31.

Referring to FIG. 5, a first conduit 61 having opposed end portions 62 is directly and monolithically conjoined, with no intervening elements, with the pump 51 and the filter 52 and a second conduit 63 is in direct fluid communication with the filter 52 and the upper region 31. A third conduit 64 is in direct fluid communication with the upper region 31 and the pump 51. The first 61, second 63 and third 64 conduits cooperate with the pump 51 and the filter 52 for recycling and filtering water out of the reservoir 30 along a unidirectional path.

The filter 52 includes a pair of independent cartridges 53 removably nested side-by-side. One 53A of the cartridges is formed from carbon material and another 53B of the cartridges is formed from mesh material, for absorbing particles and gases that might harm fish contained therein, as well known in the industry. The lower region 32 further includes an access door 54 for allowing the user to replace the cartridges 53 during repeated use. Such an access door 54 is vital for allowing a user to easily replace the cartridges 53 so the reservoir does not become contaminated by fish droppings and thus, become unsanitary and uninhabitable.

The assembly 10 is a practical, creative alternative to standard individual beta tanks. Such an assembly 10 enhances the overall appearance of the fish and provides a look that stimulates conversation and improves the appearance of a home or apartment.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An assembly for allowing a user to create a variety of aquatic display stands, said assembly comprising:
   a plurality of uniquely shaped modular members sized and shaped for being interfitted in a variety of patterns, each modular member being provided with at least one linear slot formed therein, each modular member having a body provided with a uniform thickness and further having planar top and bottom surfaces such that a selected body portion of said modular members can be slidably and directly engaged within the slots respectively, each of the slots being coextensively spaced such that the slots can be directly and interchangeably engaged;
   a reservoir provided with detachably conjoined upper and lower regions wherein said upper region defines a cavity for housing water and aquatic creatures, said lower region being directly engageable with selected ones of said modular members so that the reservoir can be maintained at a substantially stable and elevated position above a ground surface, wherein said reservoir comprises
   means for illuminating an outer perimeter of said lower region, said illuminating means being housed with said lower region and isolated from said upper region, and
   means for removing undesirable debris from the water contained within said upper region, said debris removing means being housed within said lower region and being in direct fluid communication with said upper region; and
   a controller for manually activating said illuminating means and said debris removing means based upon a user input.

2. The assembly of claim 1, wherein said upper and lower regions are directly conjoined to each other.

3. The assembly of claim 1, wherein said illuminating means comprises:
   an internal power supply source directly and electrically mated to said controller; and
   a plurality of LEDs juxtaposed along a perimeter of said lower region, said LEDs being electrically mated to said controller such that the user can selectively illuminate said LEDs as desired;
   wherein said lower region includes a plurality of transparent segments and a plurality of opaque segments directly interlocked therewith, said LEDs being seated adjacent said transparent segments and away from said opaque segments so that light rays can exit through said lower region and illuminate a surrounding exterior of said reservoir.

4. The assembly of claim 1, wherein said debris removing means comprises:
   a pump directly and electrically mated to said controller;
   a filter in fluid communication with said pump and said upper region, said filter being nested with said lower region and situated intermediate of said pump and said upper region;
   a first conduit having opposed end portions directly and monolithically conjoined with said pump and said filter;
   a second conduit in direct fluid communication with said filter and said upper region; and
   a third conduit in direct fluid communication with said upper region and said pump;
   wherein said first, second and third conduits cooperate with said pump and said filter for recycling and filtering water out of said reservoir along a unidirectional path.

5. The assembly of claim 4, wherein said filter comprises:
   a pair of independent cartridges removably nested side-by-side, one said cartridges being formed from carbon material and another said cartridges being formed from mesh material.

6. The assembly of claim 1, wherein said lower region further comprises: an access door for allowing the user to replace said cartridges during repeated use.

7. An assembly for allowing a user to create a variety of aquatic display stands, said assembly comprising:
   a plurality of uniquely shaped modular members sized and shaped for being interfitted in a variety of patterns, each modular member being provided with at least one linear slot formed therein, each modular member having a body provided with a uniform thickness and further having planar top and bottom surfaces such that a selected body portion of said modular members can be slidably and directly engaged within the slots respectively, each of the slots being coextensively spaced such that the slots can be directly and interchangeably engaged, selected ones of said modular members having monolithically formed tab portions extending outwardly therefrom, said tab portions being removably interfitted with the slots;

a reservoir provided with detachably conjoined upper and lower regions wherein said upper region defines a cavity for housing water and aquatic creatures, said lower region being directly engageable with selected ones of said modular members so that the reservoir can be maintained at a substantially stable and elevated position above a ground surface, wherein said reservoir comprises means for illuminating an outer perimeter of said lower region, said illuminating means being housed with said lower region and isolated from said upper region, and means for removing undesirable debris from the water contained within said upper region, said debris removing means being housed within said lower region and being in direct fluid communication with said upper region; and a controller for manually activating said illuminating means and said debris removing means based upon a user input.

8. The assembly of claim 7, wherein said upper and lower regions are directly conjoined to each other.

9. The assembly of claim 7, wherein said illuminating means comprises:

an internal power supply source directly and electrically mated to said controller; and a plurality of LEDs juxtaposed along a perimeter of said lower region, said LEDs being electrically mated to said controller such that the user can selectively illuminate said LEDs as desired;

wherein said lower region includes a plurality of transparent segments and a plurality of opaque segments directly interlocked therewith, said LEDs being seated adjacent said transparent segments and away from said opaque segments so that light rays can exit through said lower region and illuminate a surrounding exterior of said reservoir.

10. The assembly of claim 7, wherein said debris removing means comprises:

a pump directly and electrically mated to said controller;

a filter in fluid communication with said pump and said upper region, said filter being nested with said lower region and situated intermediate of said pump and said upper region;

a first conduit having opposed end portions directly and monolithically conjoined with said pump and said filter;

a second conduit in direct fluid communication with said filter and said upper region; and a third conduit in direct fluid communication with said upper region and said pump;

wherein said first, second and third conduits cooperate with said pump and said filter for recycling and filtering water out of said reservoir along a unidirectional path.

11. The assembly of claim 10, wherein said filter comprises:

a pair of independent cartridges removably nested side-by-side, one said cartridges being formed from carbon material and another said cartridges being formed from mesh material.

12. The assembly of claim 7, wherein said lower region further comprises: an access door for allowing the user to replace said cartridges during repeated use.

13. An assembly for allowing a user to create a variety of aquatic display stands, said assembly comprising:

a plurality of uniquely shaped modular members formed from non-corrosive material and sized and shaped for being interfitted in a variety of patterns, each modular member being provided with at least one linear slot formed therein, each modular member having a body provided with a uniform thickness and further having planar top and bottom surfaces such that a selected body portion of said modular members can be slidably and directly engaged within the slots respectively, each of the slots being coextensively spaced such that the slots can be directly and interchangeably engaged, selected ones of said modular members having monolithically formed tab portions extending outwardly therefrom, said tab portions being removably interfitted with the slots;

a reservoir provided with detachably conjoined upper and lower regions wherein said upper region defines a cavity for housing water and aquatic creatures, said lower region being directly engageable with selected ones of said modular members so that the reservoir can be maintained at a substantially stable and elevated position above a ground surface, wherein said reservoir comprises means for illuminating an outer perimeter of said lower region, said illuminating means being housed with said lower region and isolated from said upper region, and means for removing undesirable debris from the water contained within said upper region, said debris removing means being housed within said lower region and being in direct fluid communication with said upper region; and a controller for manually activating said illuminating means and said debris removing means based upon a user input.

14. The assembly of claim 13, wherein said upper and lower regions are directly conjoined to each other.

15. The assembly of claim 13, wherein said illuminating means comprises:

an internal power supply source directly and electrically mated to said controller; and a plurality of LEDs juxtaposed along a perimeter of said lower region, said LEDs being electrically mated to said controller such that the user can selectively illuminate said LEDs as desired;

wherein said lower region includes a plurality of transparent segments and a plurality of opaque segments directly interlocked therewith, said LEDs being seated adjacent said transparent segments and away from said opaque segments so that light rays can exit through said lower region and illuminate a surrounding exterior of said reservoir.

16. The assembly of claim 13, wherein said debris removing means comprises:

a pump directly and electrically mated to said controller;

a filter in fluid communication with said pump and said upper region, said filter being nested with said lower region and situated intermediate of said pump and said upper region;

a first conduit having opposed end portions directly and monolithically conjoined with said pump and said filter;

a second conduit in direct fluid communication with said filter and said upper region; and a third conduit in direct fluid communication with said upper region and said pump;

wherein said first, second and third conduits cooperate with said pump and said filter for recycling and filtering water out of said reservoir along a unidirectional path.

17. The assembly of claim 16, wherein said filter comprises:

a pair of independent cartridges removably nested side-by-side, one said cartridges being formed from carbon material and another said cartridges being formed from mesh material.

18. The assembly of claim 13, wherein said lower region further comprises: an access door for allowing the user to replace said cartridges during repeated use.

* * * * *